United States Patent
Carignan et al.

(10) Patent No.: US 7,862,524 B2
(45) Date of Patent: Jan. 4, 2011

(54) PORTABLE ARM EXOSKELETON FOR SHOULDER REHABILITATION

(76) Inventors: Craig R. Carignan, 9206 Wofford La., College Park, MD (US) 20740; Michael Scott Liszka, 4711 Caddo Rd., College Park, MD (US) 20740

( * ) Notice: Subject to any disclaimer, the term of this patent is extended or adjusted under 35 U.S.C. 154(b) by 902 days.

(21) Appl. No.: 11/689,631

(22) Filed: Mar. 22, 2007

(65) Prior Publication Data
US 2007/0225620 A1 Sep. 27, 2007

Related U.S. Application Data

(60) Provisional application No. 60/743,695, filed on Mar. 23, 2006.

(51) Int. Cl.
*A61H 1/02* (2006.01)
(52) U.S. Cl. ............................................. 601/5; 601/33
(58) Field of Classification Search ........ 601/5, 601/33, 34, 35; 600/587, 595; 623/57, 58
See application file for complete search history.

(56) References Cited

U.S. PATENT DOCUMENTS

| | | | | |
|---|---|---|---|---|
| 4,180,870 | A * | 1/1980 | Radulovic et al. | 623/26 |
| 4,669,451 | A * | 6/1987 | Blauth et al. | 601/33 |
| 5,417,643 | A * | 5/1995 | Taylor | 601/33 |
| 5,845,540 | A | 12/1998 | Rosheim | |
| 6,007,500 | A * | 12/1999 | Quintinskie, Jr. | 601/5 |
| 6,301,526 | B1 | 10/2001 | Kim et al. | |
| 6,676,612 | B1 * | 1/2004 | Beny et al. | 601/5 |
| 6,695,795 | B2 * | 2/2004 | Knoll | 601/5 |
| 2003/0115954 | A1 * | 6/2003 | Zemlyakov et al. | 73/379.01 |
| 2003/0223844 | A1 | 12/2003 | Schiele et al. | |
| 2004/0158175 | A1 * | 8/2004 | Ikeuchi et al. | 601/5 |
| 2006/0150753 | A1 * | 7/2006 | Massimo et al. | 73/865.4 |
| 2009/0033045 | A1 * | 2/2009 | Clemens et al. | 280/6.15 |

OTHER PUBLICATIONS

Repperger D, Remis S & Merrill G, "Performance measures of teleoperation using an exoskeleton device", Proc. of the IEEE Int. Conf. on Robotics and Automation, Cincinnati, May 1990, pp. 552-557.

Rosen J, Perry J, Manning N, Burns S & Hannaford B, "The human arm kinematics and dynamics during daily activities—toward a 7 DOF upper limb powered exoskeleton", 12th Int. Conf. on Advanced Robotics (ICAR), Jul. 2005, Seattle, pp. 532-539.

(Continued)

*Primary Examiner*—Danton DeMille

(57) ABSTRACT

The present invention relates to an exoskeleton interface apparatus that parallels human arm motion and is comprised of a serial assemblage of five powered linkages and joints based at a rigid support structure worn on the torso of the human subject. Such apparatus generates shoulder rotation using three orthogonal revolute joints mounted on serial linkages encompassing and intersecting at the anatomical glenohumeral joint. Elevation of the shoulder joint is articulated using a link member driven by a single revolute joint mounted in the torso structure. Passive adjustable linkages are used to match variation in anatomical forearm length, upper arm length, and scapula-to-glenohumeral radius. A plurality of integrated dc motor/harmonic drive transmission modules is co-located on adjoining linkages to power the joints. Force is exchanged with the human at the handgrip and elbow brace, and reacted to the torso structure via the base attachment. The present invention is applicable in particular to rehabilitation of the shoulder.

11 Claims, 11 Drawing Sheets

OTHER PUBLICATIONS

Nef T, Mihelj M, Colombo G & Riener R, "Armin—robot for rehabilitation of the upper extremities", Proc. IEEE Int. Conf. on Robotics and Automation, 2006, Orlando, pp. 3152-3157.

Mayr A, Mina S, Kochln G, Kronreif G & Saltuari L, "A New Driven Orthosis for the Upper Extremity (ARMOR): Preliminary Results", 4th World Congress for NeuroRehabilitation, Neurorehabil Neural Repair, 2006, vol. 20, No. 1, pp. 109.

Jacobsen S, Smith F & Backman D, "High performance, dextrous telerobotic manipulator with force reflection", Intervention/ROV '91 Conference and Exposition, Hollywood, Florida, Marine Technology Society, May 1991, pp. 213-218.

Caldwell D, Favede C & Tsagarakis N, "Dextrous exploration of a virtual world for improved prototyping", Proc. of the IEEE Intl. Conf. on Robotics and Automation, Leuven, Belgium, May 1998, pp. 298-303.

NASA Tech, "Sensory-Feedback Exoskeletal Arm Controller", NASA Tech Brief, MSC-22563, Apr. 2004. http://www.nasatech.com/Briefs/Apr04/MSC22563.html.

Johnson G, Carus D, Parrini G, Marchese S, Valeggi R, "The design of a five-degree-of-freedom powered orthosis for the upper limb", Proc. Instn. Mech. Engrs. Part H, 2001, vol. 215, pp. 275-284.

He J, Koeneman E, Huang H, Herring D, Sugar T, Herman R, Koeneman J, "Design of a Robotic Upper Extremity Repetitive Therapy Device", Proc. Int. Conf. on Rehabilitation Robotics (ICORR), Chicago, Jun. 2005.

Nakai A, Ohashi T & Hashimoto H, "7 dof arm type haptic interface for teleoperation and virtual reality systems", Proc. of the IEEE/RSJ Intl. Conf. on Intelligent Robots and Systems, Victoria, B.C., Canada, Oct. 1998, pp. 1266-1271.

Williams R, Murphy M, North D, Berlin J & Krier M, "Kinesthetic force/moment feedback via active exoskeleton", Proc. of the Image Society Conference, Scottsdale, Aug. 1998.

Carignan C, Liszka M & Roderick S, "Design of an Exoskeleton with Scapula Motion for Shoulder Rehabilitation", Proc. IEEE Int. Conf. on Advanced Robotics (ICAR), Jul. 2005, Seattle, pp. 524-531.

Bergamasco M, Allotta B, Bosio L, Ferretti L, Parrini G, Prisco G, Salsedo F & Sartini G, "An arm exoskeleton system for teleoperation and virtual environments applications", Proc. of the IEEE Int. Conf. on Robotics and Automation, San Diego, 1994, pp. 1449-1454.

Chou W, Wang T & Xiao J, "Haptic interaction with virtual environment using an arm type exoskeleton device", Proc. of the IEEE Intl. Conf. on Robotics and Automation, New Orleans, Apr. 2004, pp. 1992-1997.

Schiele A & Visentin G, "The ESA human arm exoskeleton for space robotics telepresence", Proc. 7th Int. Symposium on Artificial Intelligence, Robotics and Automation in Space (iSAIRAS), 2006, Nara, Japan.

Frisoli A, Rocchi F, Marcheschi S, Dettori A, Salsedo F & Bergamasco M, "A new force-feedback arm exoskeleton for haptic interaction in virtual environments", Proc. of the First Joint Eurohaptics Conference and Symposium on Haptic Interfaces for Virtual Environment and Teleoperator Systems, 2005.

\* cited by examiner

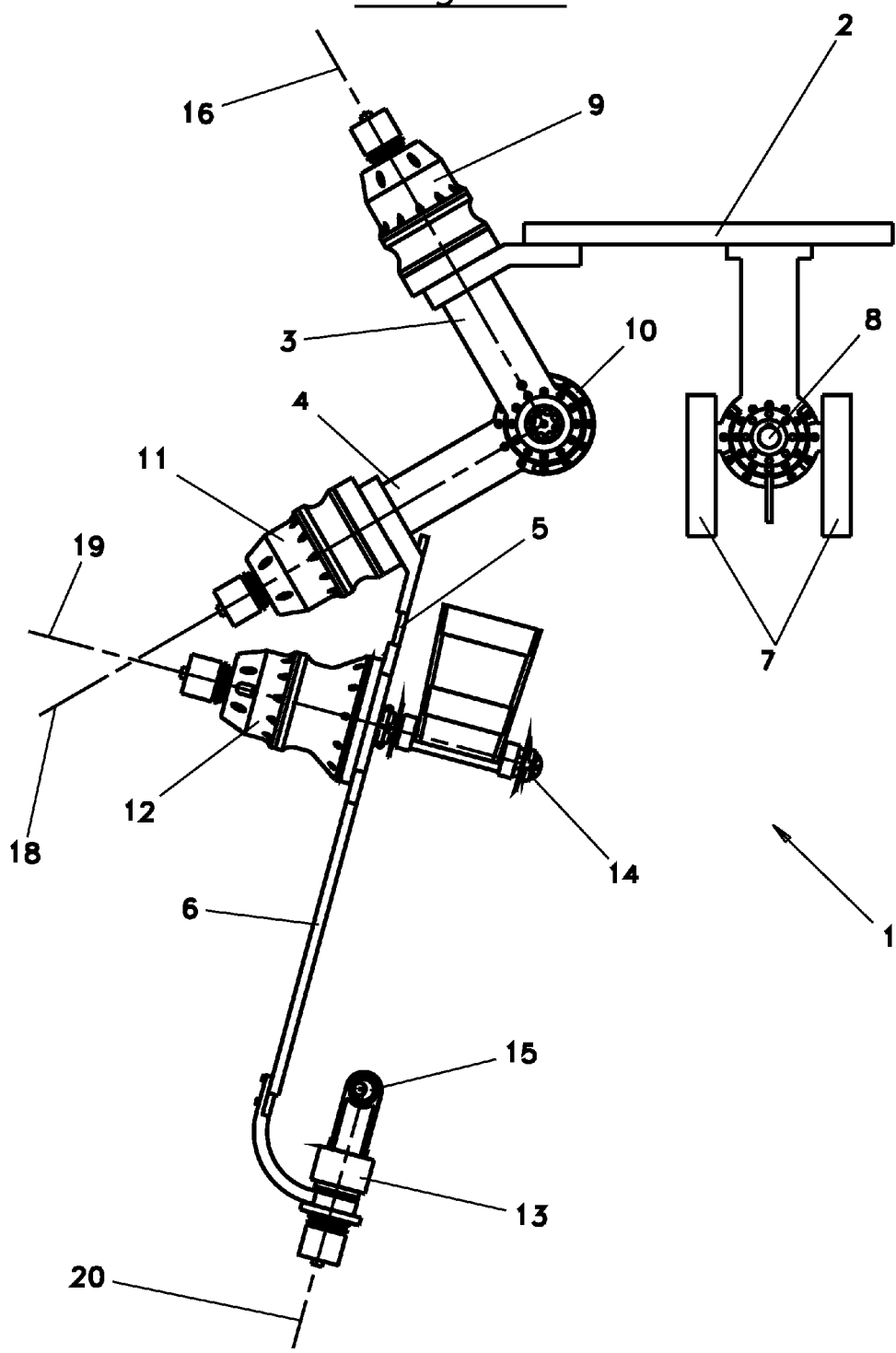

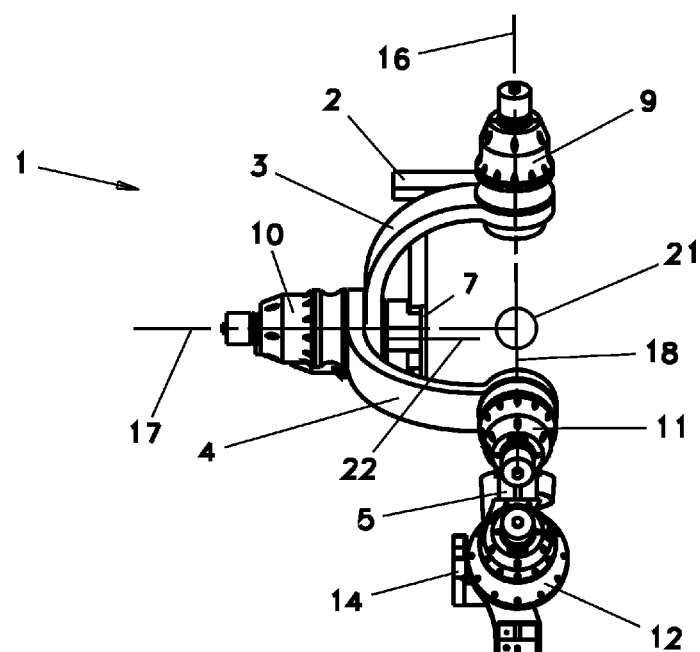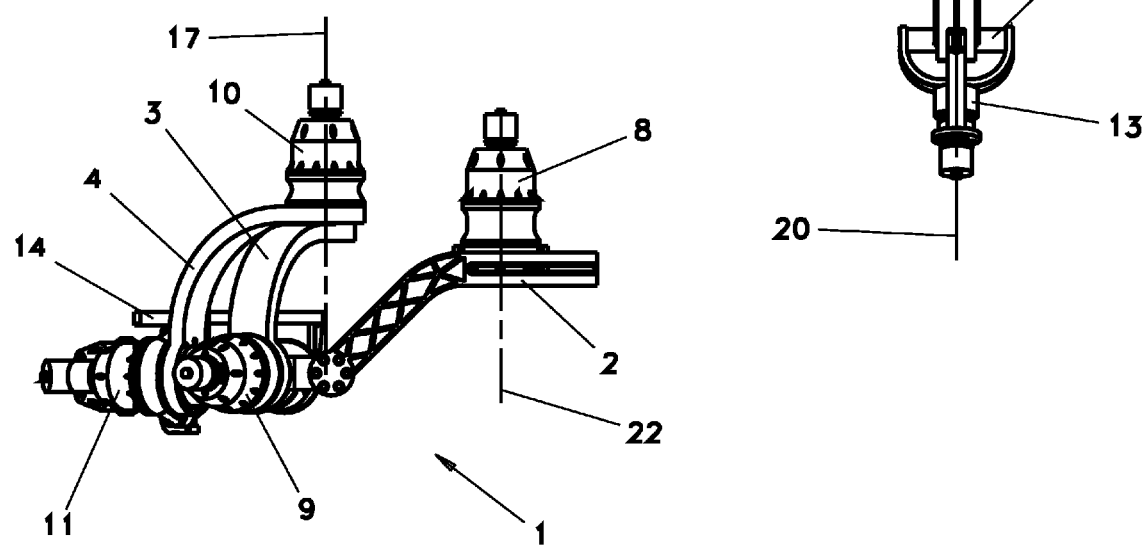

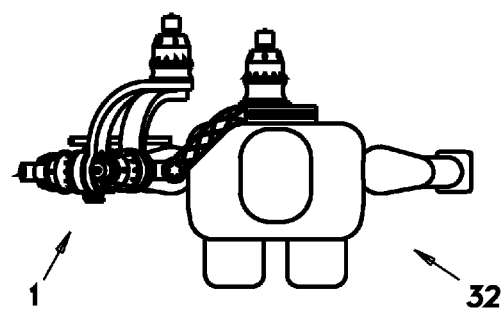
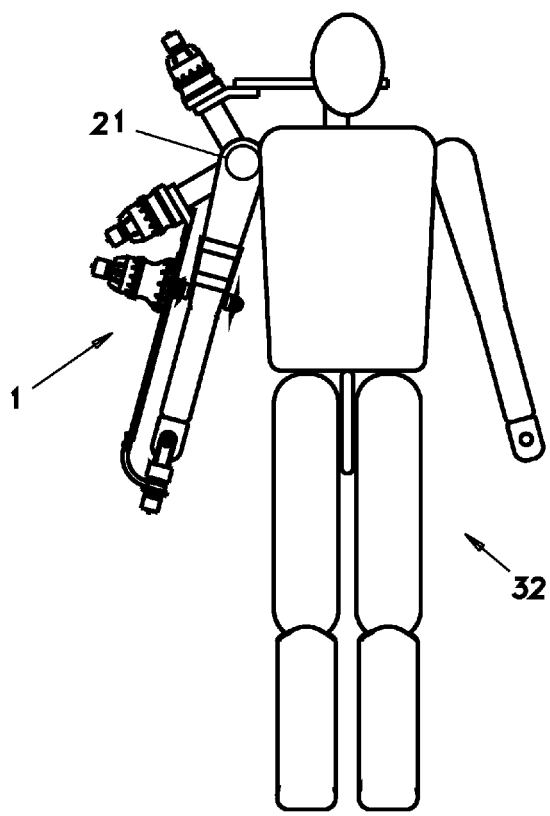
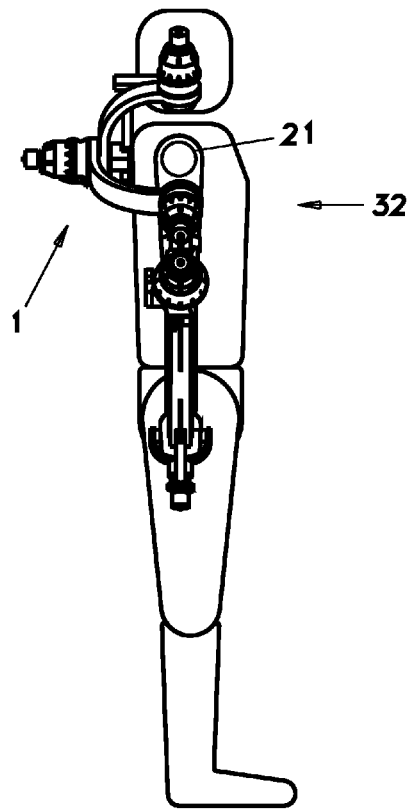

PORTABLE ARM EXOSKELETON FOR SHOULDER REHABILITATION

CROSS-REFERENCE TO RELATED APPLICATIONS

This application claims the benefit of U.S. Provisional Application No. 60/743,695 filed on Mar. 23, 2006.

STATEMENT REGARDING FEDERALLY SPONSORED RESEARCH OR DEVELOPMENT

This research was sponsored by the Department of the Army Medical and Materiel Command under Grant #W81XWH-04-1-0078K (K. Cleary, P. I.; Jan. 1, 2004-Jan. 21, 2008). The U.S. Army has ceded the rights on this invention, but retains a royalty-free, non-exclusive license to use and make the invention or have the invention used or made for governmental purposes.

BACKGROUND OF THE INVENTION

1. Field of the Invention

The present invention relates to an electromechanical robotic device that is worn over the human arm.

In particular, this invention relates to a torso-mounted, powered arm exoskeleton that is capable of moving in parallel with the human arm, reacting and exerting forces, and providing sensory feedback during shoulder rehabilitation.

2. Description of the Related Art

Robotic arm exoskeletons are powered electromechanical devices that surround the arm and interface the human limbs via mechanical attachments or inflatable bladders. The base member of an arm exoskeleton is either mounted to the subject via a torso support worn on the upper extremity or to a ground support such as a floor or wall. The former will henceforth be referred to as "torso-mounted" and the latter as "floor-mounted".

The joints are powered with actuators either by direct-drive or a mechanical transmission such as a gear, cable-tendon, belt, or lever arm. Floor-mounted exoskeletons typically use cable-tendons to drive the joints from motors located in the base in order to off-load weight from the arm.

To be used for shoulder rehabilitation, an arm exoskeleton should possess the following properties: (1) anthropomorphic arm motion, (2) singularity-free shoulder workspace, and (3) shoulder axes intersect at the anatomical glenohumeral (GH) joint.

To realize anthropomorphic arm motion, the joint ranges must be comparable to those of the human arm. Matching the joint ranges is exceedingly difficult when using single-axis revolute joints because the linkages easily interfere with each other thus limiting the range of motion. By skewing the third joint axis away from being co-linear with the upper arm, the exoskeleton shoulder (rotation) workspace more closely matches that of the human shoulder. To keep the joints aligned with those of the human, the lengths of the upper arm and forearm linkages should be adjustable to match the anatomical limb lengths. This adjustability is usually absent when the joints are driven with cables from motors mounted in a base platform.

To achieve a singularity-free shoulder workspace, no two of the three shoulder joints can become aligned while operating within the human range. In this configuration, the shoulder is "gimbal-locked" and can only rotate about two independent axes. For an orthogonal three-axis shoulder assembly, this configuration occurs when the first and third joint axes align so that the singularity is along the first joint axis. By skewing the first joint axis medially (downward toward the torso) in the frontal plane, the singularity is no longer straight up down along the shoulder azimuth but rather inward toward the body which is not reachable by the human arm.

To maintain coincidence of the exoskeleton shoulder joint with the human glenohumeral joint, the shoulder joint must be able to translate approximately along the surface of a sphere relative to the scapula joint when lifting the arm above shoulder level. This torso-to-shoulder articulation is required to provide anatomically correct shoulder movement and avoid misalignment stress during elevation of the upper arm.

Although it is not a requirement, a torso-mounted design is highly preferable to allow subject mobility and energy transfer from the trunk to the arm during functional rehabilitation. A torso-mounted design also provides a deterministic relationship between the trunk and the arm through mechanical articulation of the exoskeleton. In floor-mounted exoskeletons, the posture of the human torso is left unconstrained, and the exoskeleton configuration with respect to the torso cannot be determined without external instrumentation.

Most arm exoskeletons built to-date were developed as force-feedback devices for tele-operation or virtual reality (VR) applications. The purpose of these exoskeletons is to impart "contact" forces at the handgrip of the exoskeleton that replicate forces sensed by the slave arm during tele-operation or interaction with a virtual environment in VR applications. These types of exoskeletons are typically not capable of exerting enough force for exercise therapy or having the interfaces required to apply force at multiple contact points along the length of the arm. Many kinematic properties required for shoulder therapy, such as anthropomorphic range of motion and torso-to-shoulder articulation, are often lacking as well.

Before the present invention was undertaken, we performed an extensive search of the prior art (Carignan et al., 2005). The following exoskeletons were built as force-reflecting master arms and haptic devices:

Sarcos, Inc. produced a hydraulic-powered master arm, which had a three-axis intersecting shoulder joint with a skewed first axis in the frontal plane and a third joint axis co-linear with the upper arm. The design was floor-mounted, and it had no torso-to-shoulder articulation (Jacobsen et al., 1991).

Odetics, Inc. built the FreFlex master arm, which had only two shoulder joints. It was floor-mounted and had no torso-to-shoulder articulation (Williams et al., 1998).

U.S. Pat. No. 5,845,540 (Rosheim) discloses a master arm exoskeleton structure with a three-axis intersecting shoulder joint, which does not intersect at the GH joint. The exoskeleton is torso-mounted but does not have torso-to-shoulder articulation.

Exos, Inc. built the Exos Force ArmMaster, which has a three-axis intersecting shoulder joint. The first shoulder joint axis is skewed at an acute angle to the azimuth axis in the sagittal (not frontal) plane, and the third shoulder joint axis is co-linear with the upper arm. The exoskeleton is torso-mounted, but it has no torso-to-shoulder articulation (NASA Tech, 2004).

The PERCRO Lab produced the GLAD-IN-ART Exoskeleton, which has a three-axis intersecting shoulder joint and co-linear third joint axis. It is floor-mounted and has no torso-to-shoulder articulation (Bergamasco et al., 1994).

The University of Tokyo produced the Sensor Arm, which has a three-axis intersecting shoulder joint and co-linear third joint axis. It is floor-mounted and has no torso-to-shoulder articulation (Nakai et al., 1997).

The Korea Institute of Science and Technology built a torso-mounted master device described in U.S. Pat. No. 6,301,526 (Kim, Lee & Lee), which has a three-axis intersecting shoulder joint. However, the shoulder joint does not intersect at the anatomical GH joint, and it has no torso-to-shoulder articulation.

Beijing University produced a torso-mounted arm exoskeleton device with a three-axis intersecting shoulder joint and co-linear third joint axis. It is driven by flex-cables from motors in a backpack, but it does not have torso-to-shoulder articulation (Chou et al., 2004).

Note that several labs have also built passive (unpowered) exoskeletons for various purposes, but these cannot exert forces required for physical therapy. However, we note them here for their kinematic properties:

MB Associates built the passive MB Exoskeleton with adjustable link lengths for taking anthropomorphic measurements. It has a three-axis intersecting shoulder joint with a co-linear third joint axis. It is torso-mounted, but it has not torso-to-shoulder articulation (Repperger et al., 1991).

The University of Salford built the passive Salford Arm-Master for placing tactile sensors on the arm, which has a three-axis intersecting shoulder joint and co-linear third shoulder joint axis. It is torso-mounted and has torso-to-shoulder articulation (scapula tilt and medial rotation). It did not have structural support for exerting significant joint torques (Caldwell et al., 1998)

The development of robotic exoskeletons for physical therapy is relatively recent. Here is a summary of rehabilitation arm exoskeletons that we know of which have been developed to-date:

The University of Newcastle built the Motorized Upper Limb Orthotic System (MULOS), which is a wheelchair-mounted exoskeleton developed to assist persons with weak upper limbs. It has a three-axis intersecting shoulder joint, and the first shoulder joint is tilted at an acute angle to the shoulder azimuth in the sagittal (not frontal) plane. The third joint axis is skewed with respect to the upper arm to increase workspace. The link lengths are fixed and there is no torso-to-shoulder articulation. It not powerful enough to be used for physical therapy (Johnson, 2001).

Arizona State University built the Robotic Upper Extremity Repetitive Therapy (RUPERT), which is a torso-mounted exoskeleton with three total joints (only one shoulder) powered using pneumatic muscles. It does not have torso-to-shoulder articulation (He et al, 2005).

U.S. patent application Ser. No. 10/017,280 (Zemlyakov & McDonough) discloses an upper extremity exoskeleton structure that has a three-axis intersecting shoulder joint and two torso-to-shoulder articulations. The first torso-to-shoulder joint is rotation about the torso azimuth, which produces shoulder protraction-retraction. The second torso-to-shoulder joint is rotation about an axis perpendicular to the frontal plane, which produces shoulder elevation-depression. These axes intersect at a fixed-point midway between the center of the shoulder joints (with a co-linear upper arm joint), and not at the center of rotation of the scapula. In addition, the first shoulder joint axis is parallel to the torso azimuth axis, which produces a singularity when the upper arm is horizontal thereby limiting its usable workspace. The exoskeleton is floor-mounted and driven by cables from motors mounted in the base platform.

L-EXOS built by PERCRO Lab (U.S. patent application Ser. No. 10/540,918 Bergamasco et al.; Frisoli et al., 2005), Exoskeleton Prototype III built by the University of Washington (Rosen, 2005), and ARMOR built by Seibersdort-Research (Mayr et al., 2006) are all floor-mounted exoskeletons with a three-axis intersecting shoulder joint and a co-linear third joint. They utilize cable-tendons to drive the joints from motors in the base platform, and they have no torso-to-shoulder articulation.

We have encountered only two powered rehabilitation exoskeleton designs that incorporate torso-to-shoulder articulation:

ETH Zurich built ARMin II, which is a floor-mounted design with six revolute joints that allow three-axis shoulder rotation (third joint co-linear with upper arm), elbow flexion/extension, pro/supination of the lower arm, and wrist flexion/extension (Nef et al., 2006). A seventh linear joint is coupled to shoulder flexion movements to enable the shoulder axis triad to move in vertical direction when the arm is lifted. Although this vertical motion is approximately correct, it is not along an arc traveled by the anatomical shoulder joint.

U.S. patent application Ser. No. 10/443,111 (Schiele & Visentin) discloses the ESA Human Arm Exoskeleton, which is a torso-mounted exoskeleton with a total of six joints for realizing rotation and translation of the shoulder joint: two rotations in the torso assembly, three rotations in the shoulder assembly, and one prismatic joint connecting the two assemblies. While this design allows full torso-to-shoulder articulation, the prismatic joint and several of the rotational joints in the shoulder complex are passive (spring-loaded) and thus cannot be actively controlled. In addition, the three rotational joints in the shoulder assembly do not intersect at the GH joint (Schiele & Visentin, 2006).

To summarize, many existing exoskeletons have design features relevant to proper shoulder articulation for rehabilitation, but none have the same portability, anthropomorphic range, and powered kinematic sequence as the present invention: torso-to-shoulder articulation to enable scapula rotation (shoulder elevation) followed by a tri-axial shoulder joint to allow three-axis rotation of the shoulder about the anatomical glenohumeral joint.

SUMMARY OF THE INVENTION

The present invention solves the shortcomings of the prior art by providing an exoskeleton design with human force/motion capabilities suitable for physical therapy of the shoulder. This objective is accomplished by combining several key properties: portability afforded by simple kinematic structure, articulation of shoulder elevation/depression, independent three-axis rotation about the glenohumeral joint, anthropomorphic range of motion, large singularity-free workspace, and co-located high-power actuator modules.

In accordance with this design objective, the exoskeleton structure is comprised of four subassemblies: scapula elevation, shoulder rotation, elbow pitch, and wrist roll. The scapula elevation assembly is mounted to the torso and is used to articulate motion of the glenohumeral joint along a circular arc in the frontal plane. The shoulder rotation assembly provides full three-axis rotation of the shoulder complex through means of a serially-connected, orthogonal-axis triad intersecting at the glenohumeral joint. The elbow pitch assembly produces elbow flexion and extension via a single rotary joint. The wrist roll assembly produces forearm pro/supination through a single rotation joint mounted to the handgrip.

In addition to the above revolute articulations, the present invention is also comprised of four linear passive adjustable links: thoracic linkage, scapula linkage, upper arm linkage, and forearm linkage. The thoracic linkage is used to provide vertical adjustment of the scapula joint on the backpack. The scapula linkage is used to adjust the radius of rotation of the glenohumeral joint about the scapula joint. The upper arm linkage is used to adjust for the anatomical humerus length. The forearm linkage is used to adjust for the anatomical ulna-radius length.

In particular, the present invention provides an arm exoskeleton attachable to a backpack mounted on the torso of the operator and progressing outward as follows:

an adjustable-length vertical thoracic linkage mounted vertically on the backpack to which the first rotary joint is attached perpendicularly to the back of the operator;

an adjustable-length scapula linkage connecting the first rotary joint to the second rotary joint mounted at an acute angle with respect to the shoulder azimuth axis in the frontal plane;

an orthogonal-axis triad comprised of the second, third, and fourth rotary joints connected together by overlapping circular arc linkages and intersecting at the glenohumeral joint;

the fourth rotary joint connected at an acute angle to an adjustable-length upper arm linkage;

the fifth rotary joint connected to the terminus of the upper arm linkage with axis coincident with elbow flexion;

the sixth rotary joint connected orthogonally to the fifth rotary joint by an adjustable-length forearm linkage; and a handgrip mounted orthogonally to the sixth rotary joint to realize forearm pronation/supination.

In addition to the above articulations, three interfaces are provided for force exchange between the human operator and the exoskeleton: at the hand, at the elbow, and at the torso. The handgrip provides a means of force transmission between the human hand and the exoskeleton through a six-axis force-torque sensor mounted to the handgrip bracket. An upper arm brace provides force transmission between the human elbow and the exoskeleton through a pair of axial load cells mounted between the brace and the elbow-mounting bracket. The thoracic linkage provides a means of force transmission between the human torso and the base attachment of the exoskeleton.

The first through fifth joints are each powered by an actuator module consisting of a coupled dc motor/harmonic drive co-located on adjoining linkages. The angles of all the joints are obtained through means of both absolute and incremental optical encoders to provide redundant sensing.

BRIEF DESCRIPTION OF THE DRAWINGS

Further characteristics and the advantages of the exoskeleton interface apparatus, according to the present invention, will be made clearer with the following description of an embodiment thereof, exemplifying but not limitative, with reference to the attached drawings, wherein:

FIGS. 1 to 4 show in different perspective views an exoskeleton interface apparatus according to the invention from different angles for showing the different parts thereof;

FIGS. 10 to 13 show a perspective view according to different angles of the exoskeleton interface apparatus of FIG. 1 put on a human;

DETAILED DESCRIPTION OF A PREFERRED EMBODIMENT

Figure 1:
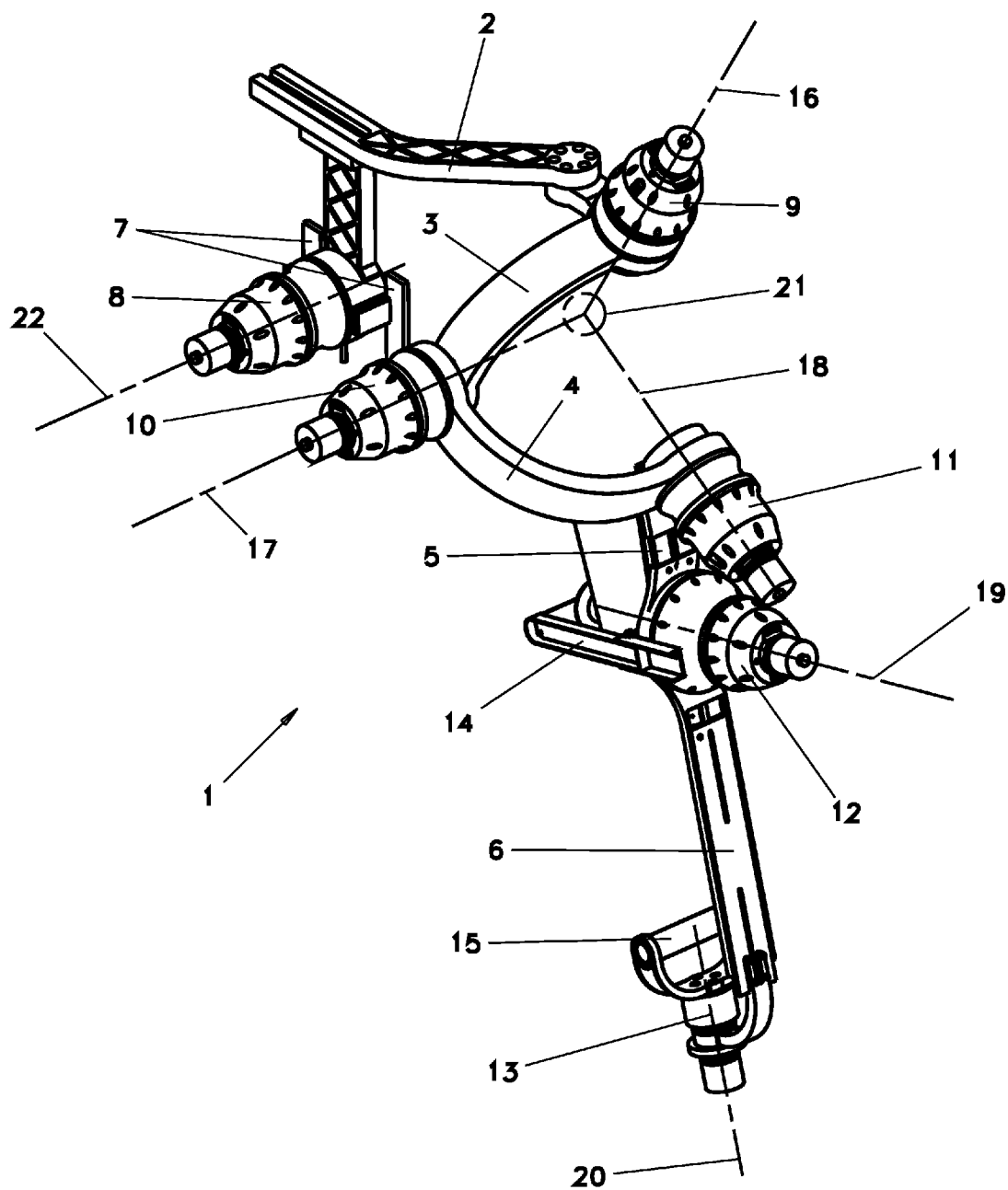
Figure 5:
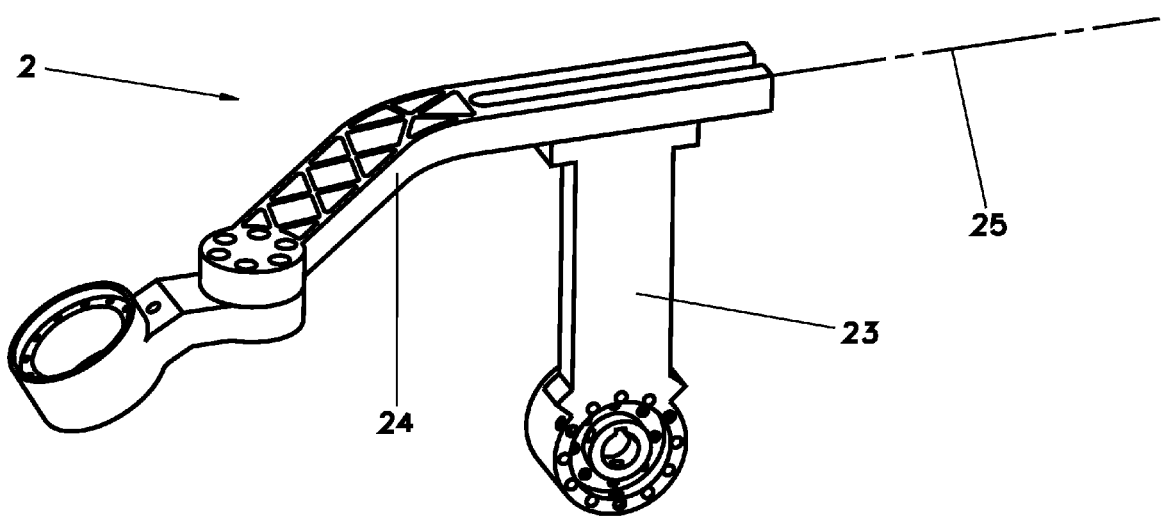
FIGS. 5 to 7 show in a perspective view possible embodiments of rigid links with length adjustment, and the components thereof.
Figure 6:
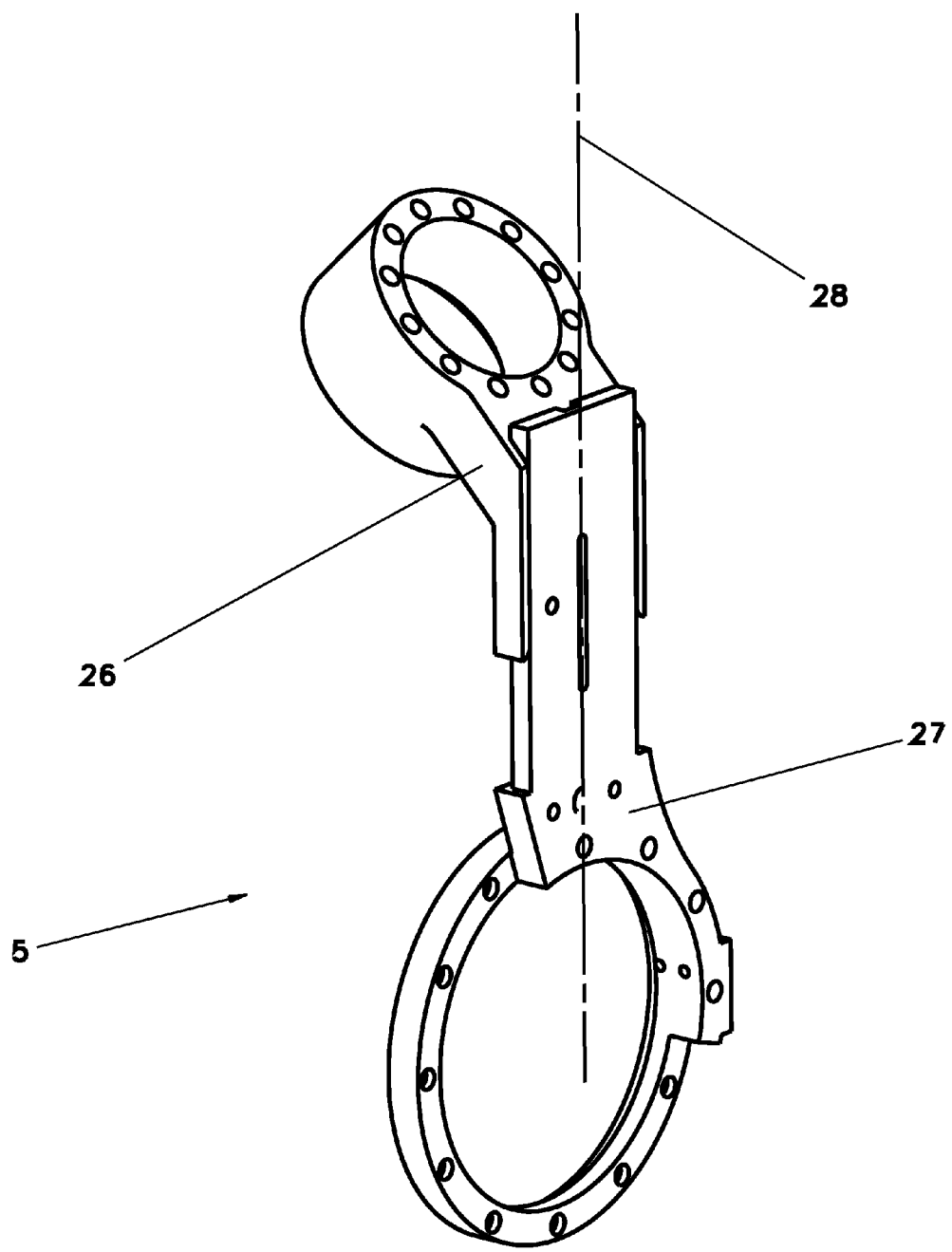
Figure 7:
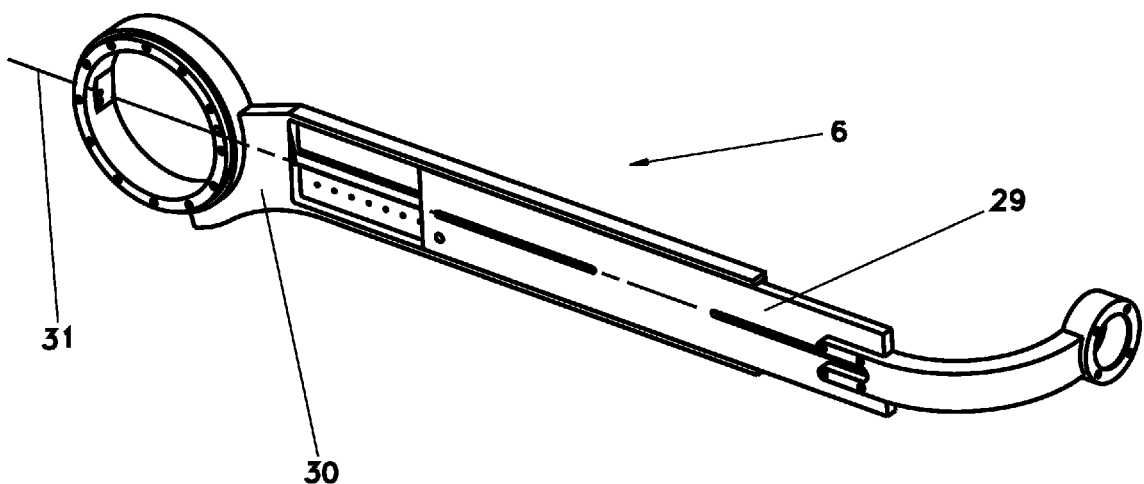
Figure 8:
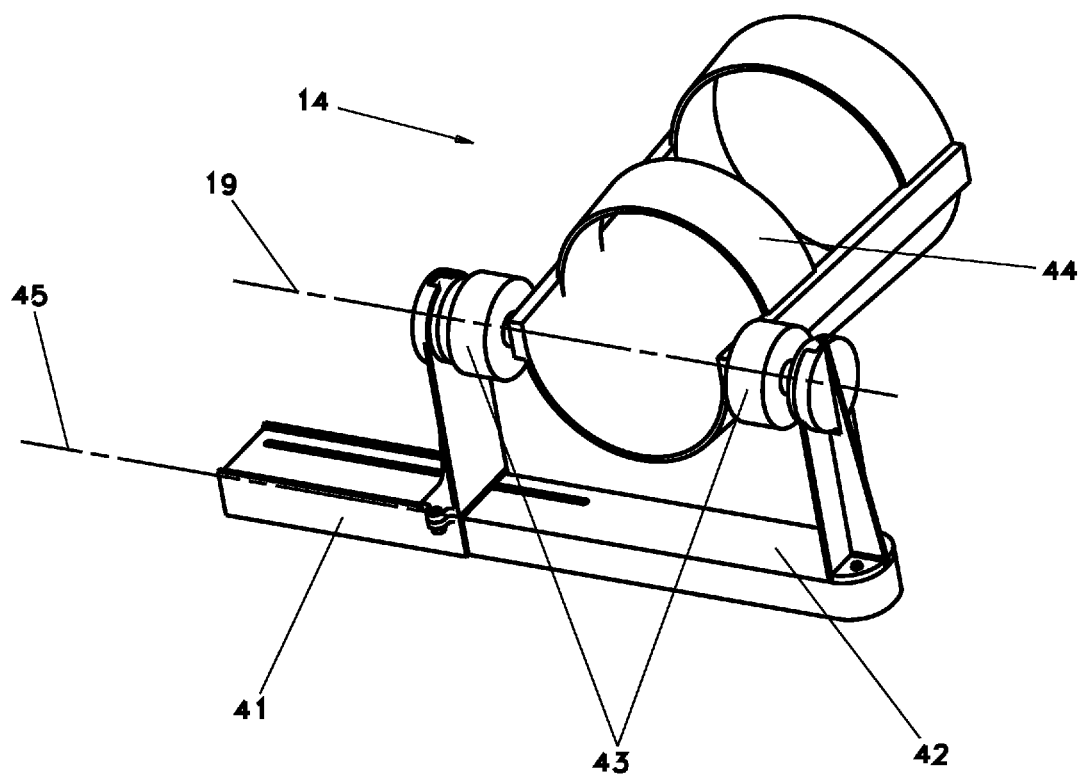
FIG. 8 shows in a perspective view a possible embodiment of an upper arm mechanism to restrain a human to the device in FIG. 1 and to measure the reaction forces between the former and the latter.

In FIGS. 1 to 4 a possible embodiment is shown of an exoskeleton interface apparatus 1, according to the invention, for measuring the posture of the scapula, arm, forearm, and wrist of a human and for reflecting controlled forces in predetermined areas of contact thereof.

As shown in said figures, the apparatus 1 comprises six rigid links 2-7 arranged in series capable of rotating reciprocally at the respective ends for monitoring angular movements of the scapula, arm, forearm, and wrist of a human 32 and having at the tip a handgrip 15 for the human 32 same (FIGS. 10-13) for reflecting a force feedback.

In particular, rigid links 3 and 4 can rotate at their ends by rotational joints 9-11, which have their rotational axes 16-18 incident in a point 21 that is the intersection of the physiological axes of the shoulder.

More in detail, exoskeleton 1 comprises a rigid link 7, capable of being mounted on a backpack or vest worn by the human 32 for the purpose of adjusting the relative position of the apparatus 1 and the human 32, operatively connected to a second rigid link 2 at an end thereof through a first rotational joint 8 having an axis of rotation 22. The presence of second rigid link 2 allows to detect the vertical translation of shoulder 21 of human 32, since the involuntary translation of the shoulder 21 is dominated by motion in the frontal plane in a circular arc. Second rigid link 2 is adjustable by translating the distal portion 24 with respect to the proximal portion 23 along axis 25 for the purpose of controlling the distance between rotational axis 22 and the shoulder center of movement 21 to match the respective physiological geometry of the human 32. Second rigid link 2 is then connected to a third rigid link 3 by means of a second rotational joint 9 with an axis of rotation 16. Third rigid link 3 is then connected to a fourth rigid link 4 by means of a third rotational joint 10 with an axis of rotation 17 orthogonal to the axis of rotation 16 of second rotational joint 9. The presence of fifth rigid link 5, which is connected to the fourth rigid link 4 by means of a fourth rotational joint 11 with an axis of rotation 18 orthogonal to the axis of rotation 17 of third rotational joint 10, allows to detect the rotational motion of the shoulder 21 of human 32. This is possible since the kinematics of the shoulder 21 is approximated to a spherical joint with three degrees of freedom, and a measure of the angular movements of the arm is possible by causing the intersection point of the physiological axes of the shoulder to coincide with the intersection of the axes 16-18 of the exoskeleton 21 and by detecting the angular movement about each axis. Fifth rigid link 5 is adjustable by translating the distal portion 27 with respect to the proximal portion 26 along axis 28 for the purpose of controlling the distance between shoulder 21 and rotational axis 19 to match the respective physiological geometry of the human 32.

In the embodiment shown in FIGS. 1 to 4, a sixth rigid link 6 is also present associated to the handgrip 15 by means of a fifth rotational joint 12 with rotational axis 19 coincident to the axis of rotation of the elbow of the human 32 (FIGS. 10-13). In particular, handgrip 15 is connected to sixth rigid link 6 by means of a sixth rotational joint 13 with axis an axis of rotation 20, for measuring the rotation of the wrist with respect to the forearm. Sixth rigid link 6 is adjustable by translating the distal portion 29 with respect to the proximal portion 30 along axis 31 for the purpose of controlling the distance between rotational axis 19 and handgrip 15 to match the respective physiological geometry of the human 32.

Figure 9:
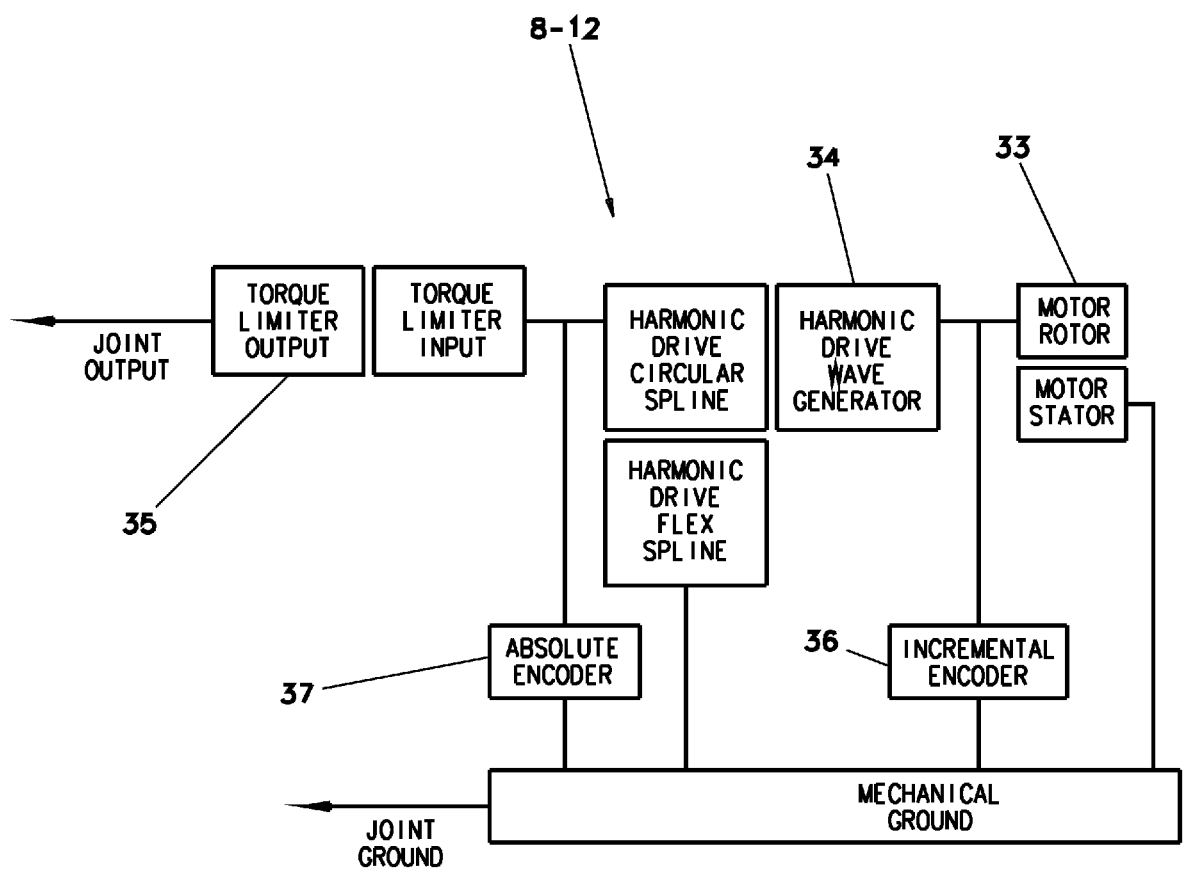
FIG. 9 shows diagrammatically the primary components of a rotational joint with harmonic drive gear reduction integrated used in the device of FIG. 1 for allowing the mutual rotation of two successive rigid links.
Figure 10:
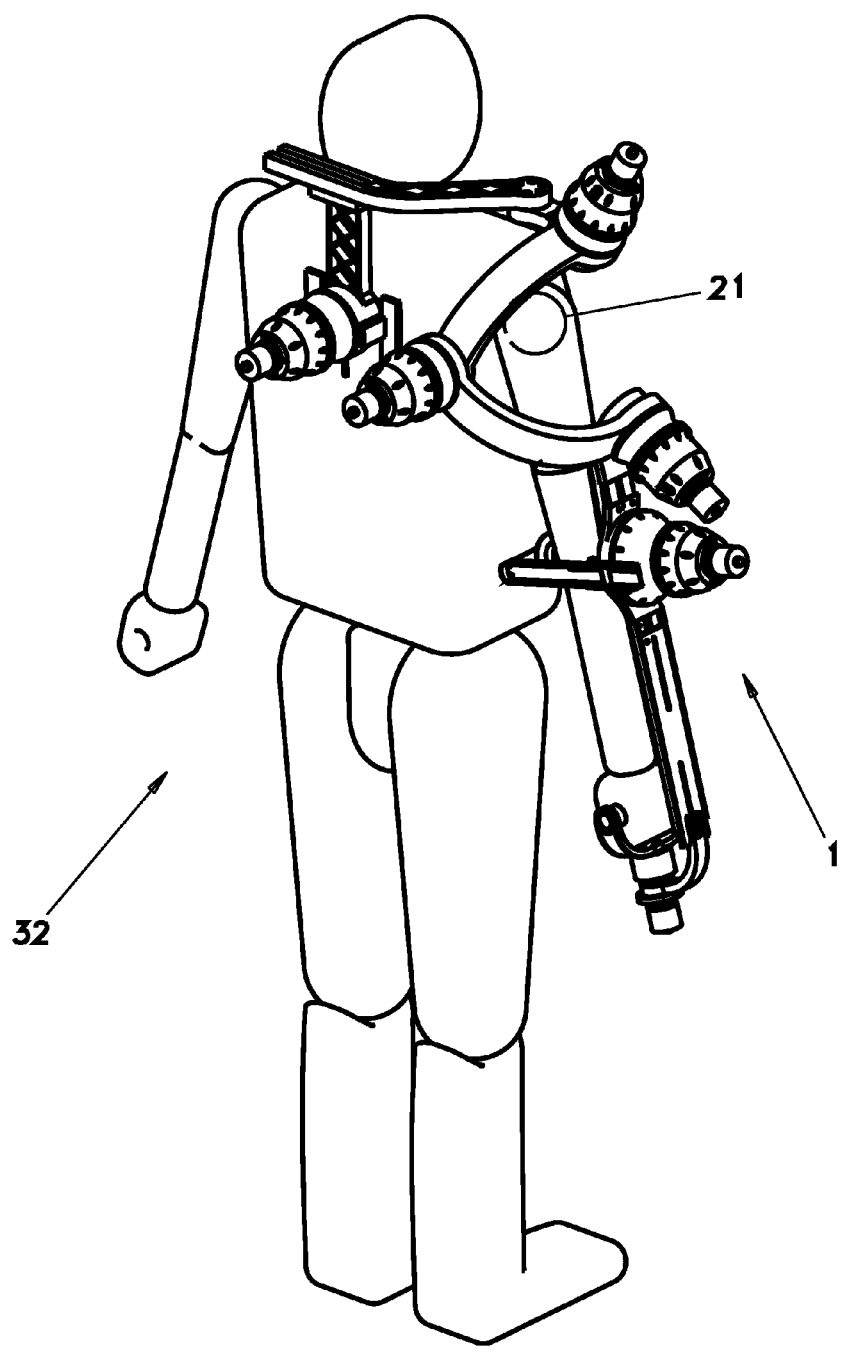

With reference to FIG. 9, where a kinematic diagrammatical view is shown of the joints 8-12, the joints are brought into rotation about the respective rotational axes 16-19 and 22 by means of motors 33 in series with speed reducing gearing 34, which is in turn in series with a torque limiting device 35 for the purpose of mechanically limiting the maximum amount of force between the apparatus 1 and the human 32.

Figure 14:
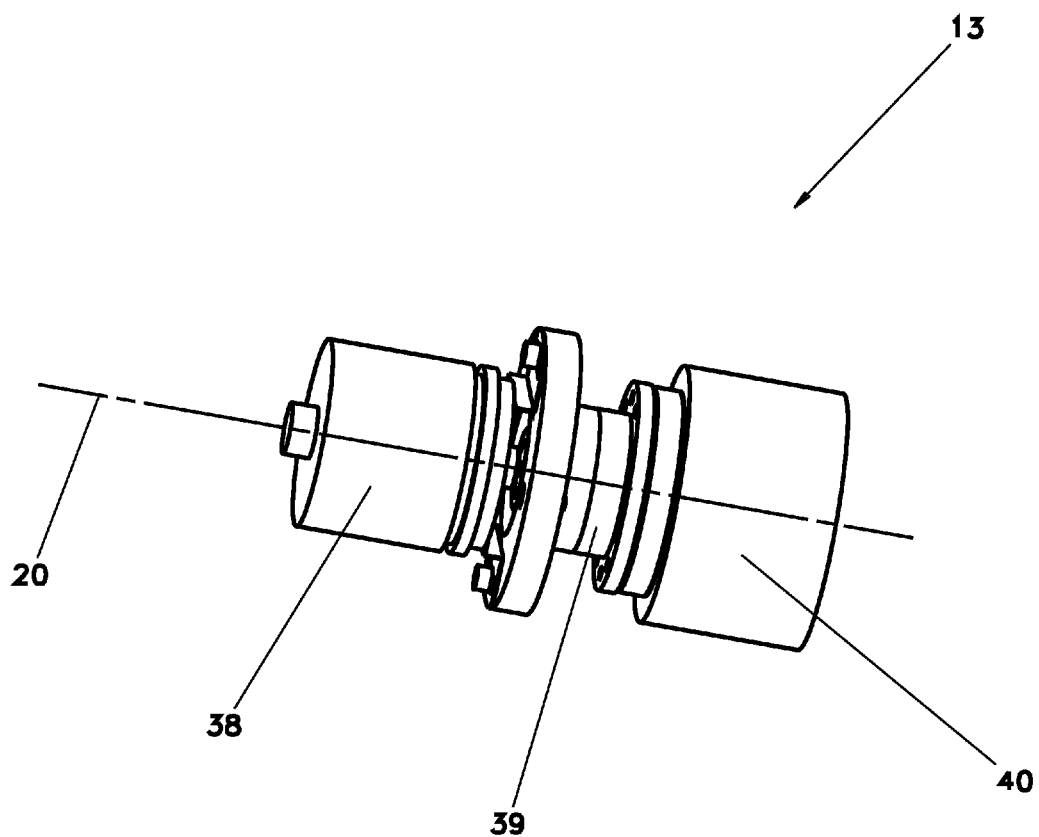
FIG. 14 shows in a perspective view the primary components of a passive joint with integral sensors used in the device of FIG. 1 for allowing the unhindered mutual rotation of two successive rigid links.

With reference to FIG. 14, where a perspective view of sixth joint 13 is shown, sixth joint axis 20 is free to rotate, where the rotation is restricted to a single axis 20 by a ball bearing 39, for example, and the angle of rotation is measured by an absolute encoder 38.

For measuring the angular position of joints 8-13, for example, a combination of high resolution incremental encoders 36 and lower resolution absolute encoders 37 can be used, which are available on the market, mounted directly on the axis of each motor 33 and gearing 35, respectively.

For measuring the contact forces and torques between the apparatus 1 and the human 32 at the points of contact on the elbow bracket 14 and handgrip 15, a combination of sensors is utilized. In more detail, the elbow bracket 14 is attached to the fifth rigid link 5 by an adjustable connection that allows the medial bracket 42 and lateral bracket 41 to move along axis 45 for the purpose of controlling the distance between the brackets 41-42 and the human 32 in the region of the elbow. Each of the brackets 41-42 is attached to a tension/compression load cell 43, which are readily available on the market, which in turn are connected to a brace 44 by means of a rigid connection. The brace 44 straps to the upper arm of the human 32, and the tension/compression cells 43 sense the force between the brace 44 and the remainder of the apparatus 1 along an axis 19. With reference to the contact point between the human 32 and the apparatus 1 at the handgrip 15, a force/torque sensor 40, capable of measuring force in all directions and torque in all directions, connects the handgrip 15 to the remainder of the apparatus 1 and senses the contact forces therein.

We claim:

1. A powered exoskeleton encompassing a human arm comprising rigid linkages connected in series by revolute joints with a first linkage securable to a torso of a human body, the exoskeleton further comprises:

three-axis rotation of a shoulder rotation assembly by means of three single-axis revolute joints mounted orthogonally to each other with axes that intersect at a point in space coincident with the human glenohumeral joint;

translation of the point of intersection of the shoulder rotation assembly with respect to the torso of the human using a scapula elevation assembly comprising a scapula linkage driven by a revolute scapula joint mounted to the first linkage;

first revolute joint axis of the shoulder rotation assembly is connected to the scapula linkage and skewed at an acute angle with respect to a vertical line through the point of intersection of the shoulder rotation assembly; and third revolute joint axis of the shoulder rotation assembly connected to an upper arm linkage and skewed with respect to the upper arm of the human.

2. A powered exoskeleton according to claim 1, wherein translation of the point of intersection of the shoulder rotation assembly joint axes is along a circular arc in the human frontal plane.

3. A powered exoskeleton according to claim 1 wherein the shoulder rotation assembly is comprised of two circular arc linkages with overlapping joints containing hardstops to limit range of motion.

4. A powered exoskeleton according to claim 1 wherein joints are driven by co-axial actuator modules comprised of dc motors coupled to harmonic drive transmissions.

5. Actuator modules according to claim 4 wherein incremental encoder measures angle of the motor shaft and absolute encoder measures angle of the transmission output.

6. A powered exoskeleton according to claim 1 wherein a force between the human arm and an elbow pitch assembly is transmitted through an upper arm brace connected to the upper arm linkage of the elbow pitch assembly.

7. The powered exoskeleton of claim 6 wherein the force between the human arm and the elbow pitch assembly is measured using a force sensor mounted between the upper arm brace and the upper arm linkage.

8. The powered exoskeleton of claim 2 wherein radius of travel of the point of intersection of the shoulder rotation assembly joint axes about the scapula joint is linearly adjustable by extension of the scapula linkage.

9. The powered exoskeleton of claim 1 wherein the upper arm linkage and a forearm linkage are linearly adjustable to match arm limb lengths of the human.

10. A powered exoskeleton according to claim 6 wherein rotation of a revolute joint of the elbow pitch assembly is coincident with rotation of a human elbow flexion and extension.

11. A powered exoskeleton according to claim 9 wherein a wrist roll assembly is comprised of the forearm linkage and a revolute joint with axis longitudinal to a human forearm and orthogonal to a handgrip.

* * * * *